US010241736B2

(12) United States Patent
Miki

(10) Patent No.: US 10,241,736 B2
(45) Date of Patent: Mar. 26, 2019

(54) SYSTEM, DISPLAY POSITION DETERMINATION METHOD, AND COMPUTER-READABLE RECORDING MEDIUM

(71) Applicant: Morio Miki, Kanagawa (JP)

(72) Inventor: Morio Miki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 226 days.

(21) Appl. No.: 15/072,544

(22) Filed: Mar. 17, 2016

(65) Prior Publication Data

US 2016/0274855 A1 Sep. 22, 2016

(30) Foreign Application Priority Data

Mar. 20, 2015 (JP) ................................ 2015-058020

(51) Int. Cl.
*G06F 3/14* (2006.01)
*H04L 12/18* (2006.01)

(52) U.S. Cl.
CPC .......... *G06F 3/1423* (2013.01); *G06F 3/1454* (2013.01); *H04L 12/1818* (2013.01); *G09G 2356/00* (2013.01)

(58) Field of Classification Search
CPC ............. H04L 12/1818; H04L 12/1822; G06F 3/1423
See application file for complete search history.

(56) References Cited

U.S. PATENT DOCUMENTS 6,434,604 B1 * 8/2002 Harada ............... H04L 12/1827 709/204
2015/0153996 A1 6/2015 Miki
2015/0334313 A1 * 11/2015 Chougle ................ H04N 7/152 348/14.07
2015/0371011 A1 12/2015 Miki

FOREIGN PATENT DOCUMENTS

JP H11-203227 7/1999
JP 2011-109371 6/2011

* cited by examiner

*Primary Examiner* — Michael A Faragalla
*Assistant Examiner* — Chayce R Bibbee
(74) *Attorney, Agent, or Firm* — IPUSA, PLLC

(57) ABSTRACT

A system includes a first processor and terminals connected to the first processor via a network. Each terminal has a second processor. The terminals includes a first terminal that transmits target data by a first user to a second terminal, so that the target data is received by the second terminal and displayed on a second column. The first processor refers to role data including identification data of the terminals associated with identification data of roles of users, determines a role of the user associated to a name of the first terminal, attaches identification data of a role of the first user to the target data, and transmits the target data and the attached identification data. The second processor receives the target data and the attached identification data and determines a position at which the target data is displayed on the second column based on role display data.

7 Claims, 16 Drawing Sheets

FIG.5

```
<message guid="qw0b54b5-c9a1-44cd-b568-b1318f3hgzwer" to="PARTICIPANT" from="CONFERENCE SERVER"
class="ROLE DATA">
<body>
  <CHAT SETTINGS>
    <RIGHT DISPLAY>MODERATOR,PRESENTER</RIGHT DISPLAY>
  </CHAT SETTINGS>
  <ROLE SETTINGS>
    <ROLE>
        <ROLE NAME>MODERATOR</ROLE NAME>
        <ID NAME>OFFICE</ID NAME>
    </ROLE>
    <ROLE>
        <ROLE NAME>PRESENTER</ROLE NAME>
        <ID NAME>ICHIRO,JIRO,SABURO</ID NAME>
    </ROLE>
  </ROLE SETTINGS>
</body>
</message>
```

FIG.6A
| ROLE NAME | DISPLAY POSITION |
|---|---|
| PRESENTER | RIGHT |
| PARTICIPANT | LEFT |
| MODERATOR | RIGHT |
FIG.6B
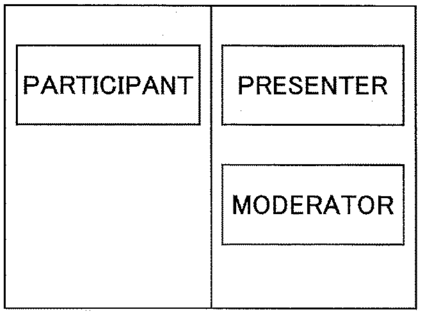
FIG.7A
| ROLE NAME | DISPLAY POSITION |
|---|---|
| PRESENTER | UP |
| PARTICIPANT | DOWN |
| MODERATOR | UP |
FIG.7B
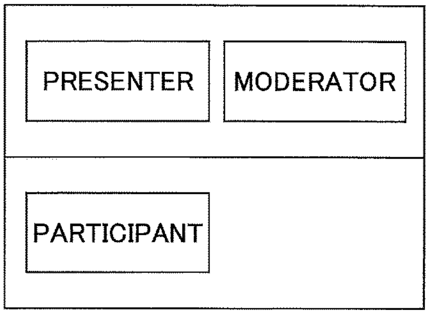

| ROLE NAME | DISPLAY POSITION |
|---|---|
| PRESENTER | CENTER |
| PARTICIPANT | LEFT |
| MODERATOR | RIGHT |

FIG.12

<message guid="opeb54b5-7gh2-44cd-b568-b2588f3d665e" to="CONFERENCE SERVER" from="PRESENTER" class="CHAT INSTRUCTION">
<body>
<MESSAGE>
<DISPLAY ORDER ID>10</DISPLAY ORDER ID>
<CONTENTS>WHAT IS BENEFIT OF VITAMIN C?\nDOES ANYONE KNOW?</CONTENTS>
<DISPLAY NAME>ICHIRO</DISPLAY NAME>
<ROLE>presenter</ROLE>
<HANDOUT PAGE DATA>112_5</HANDOUT PAGE DATA>
<TIME·DATE>2015-01-15 10:00:30</TIME·DATE>
</MESSAGE>
</body>
</message>

SYSTEM, DISPLAY POSITION DETERMINATION METHOD, AND COMPUTER-READABLE RECORDING MEDIUM

BACKGROUND OF THE INVENTION

1. Field of the Invention

The present invention relates to a system, a display position determination method, and a computer-readable recording medium.

2. Description of the Related Art

In a conventional chat application, comments are displayed, for example, in a single row or in two rows in which the comments of the user is displayed on a right side whereas the comments of the counterpart is displayed on the left side.

Conventionally, there is a text chat system that expands the ability of expressing a speaker's emotions and intentions to enable smooth communication in a network. For example, Japanese Laid-Open Patent Publication No. 11-203227 describes a text chat system that depicts the remarks of each speaker using different colors when showing the remarks on a display, so that the remarks of each speaker can easily be distinguished.

Further, chat applications are used for a question and answer session during a conference or a presentation. During the question and answer session where there are many participants in the conference or the presentation, the meaning of a remark of a speaker may differ depending on the role of the speaker (e.g., participant, presenter, moderator).

SUMMARY OF THE INVENTION

The present invention provides a system, a display position determination method, and a computer-readable recording medium that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a system, a display position determination method, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a first processor, and multiple terminal devices connected to the first processor via a network. Each of the multiple terminal devices has a second processor. The multiple terminal devices includes a first terminal device that transmits target data registered in a first display column by a first user of the first terminal device to a second terminal device, so that the target data is received by the second terminal device and displayed on a second display column of the second terminal device. The first processor refers to role data that includes identification data of the multiple terminal devices associated with identification data of roles of users of the multiple terminal devices and to determine a role of the user of the first terminal device associated to an identification name of the first terminal device. The first processor attaches identification data of a role of the first user to the target data and transmit the target data and the attached identification data of the role of the first user. The second processor receives the target data and the attached identification data of the role of the first user. The second processor determines a position at which the target data is displayed on the second display column based on role display correspondence data. The role display correspondence data includes the identification data of roles of the users of the multiple terminal devices associated with display positions in the second display column. The display positions indicate a position at which the target data is to be displayed on the second display column.

Other objects, features and advantages of the present invention will become more apparent from the following detailed description when read in conjunction with the accompanying drawings.

BRIEF DESCRIPTION OF THE DRAWINGS

FIG. 5 is a schematic diagram illustrating a configuration of role data according to an embodiment of the present invention;

FIGS. 6A and 6B are schematic diagram illustrating a role display correspondence table according to an embodiment of the present invention;

FIGS. 7A and 7B are schematic diagrams illustrating a role display correspondence table displaying according to an embodiment of the present invention;

FIG. 12 is a schematic diagram illustrating a configuration of a chat instruction according to an embodiment of the present invention;

DETAILED DESCRIPTION OF THE PREFERRED EMBODIMENTS

Next, embodiments of the present invention are described. In the description of the following embodiments, a presenter, a participant, and a moderator are examples of roles. It is, however, to be noted that the roles and role names of "presenter", "participant", and "moderator" are merely examples. Other roles and names may also be applied to the below-described embodiments.

First Embodiment

System Configuration

Figure 1:
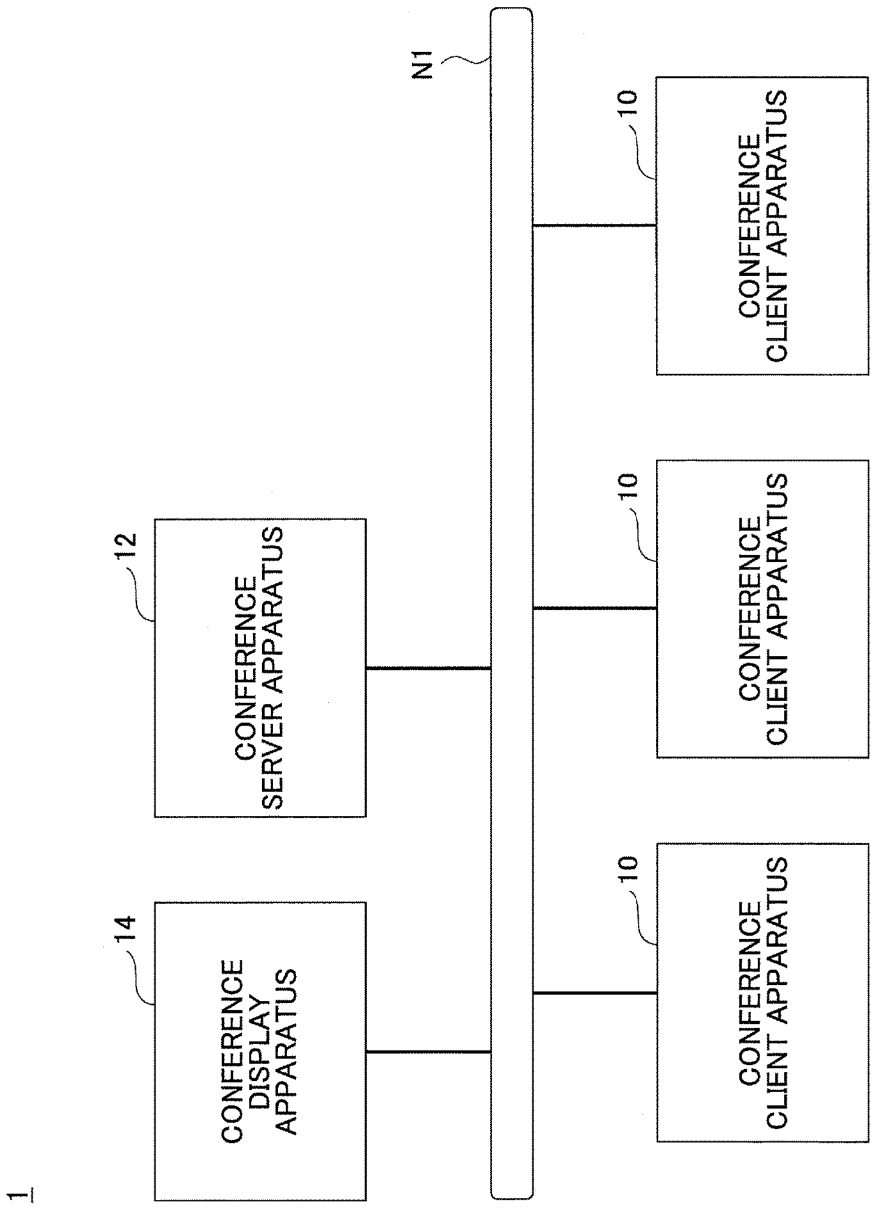
FIG. 1 is a schematic diagram illustrating a conference system according to an embodiment of the present invention.

FIG. 1 is a schematic diagram illustrating an example of a conference system 1 according to an embodiment of the present invention. The conference system 1 of FIG. 1 includes multiple conference client apparatuses 10, a conference server apparatus 12, and a conference display apparatus 14 that are connected to each other via a network N1 (e.g., LAN (Local Area Network).

The conference server apparatus 12 manages, for example, conference data and conference handouts. The conference server apparatus 12 includes functions such as organizing a conference, controlling participation to a conference, distributing the data input by a presenter or a moderator to the conference client apparatuses 10 of the participants of a conference in real time. The conference server apparatus 12 also manages role data or the like and provides chat functions to the conference client apparatuses 10.

The conference server apparatus 12 may be implemented by software and services operating inside a single computer. Alternatively, the conference server apparatus 12 may be implemented by software and services operating in multiple computers. Further, the conference server apparatus 12 may be provided in the form of a cloud service or the like.

The conference client apparatus 10 includes functions such as obtaining, for example, conference data and conference handouts from the conference server apparatus 12, receiving operations input by an operator (e.g., presenter, moderator, participant of a conference) for proceeding with the conference, and allowing operators to view the conference handouts. The operator such as the presenter, the moderator, or the participant of a conference can participate in a conference by way of the conference client apparatus 10. The conference client apparatus also has a function of receiving registration of data such as comments, images, moving images related to a chat function from an operator such as a presenter, a moderator, or a participant of a conference.

The conference client apparatus 10 may be, for example, a PC (Personal Computer), a tablet terminal, a smartphone, a mobile phone, a portable data terminal such as a PDA (Personal Digital Assistant), a conference dedicated terminal, an electronic white board, an image forming apparatus such as an MFP (Multi-Function Peripheral) or a printer. The conference client apparatus 10 receives operations input from an operator such as a presenter by way of the conference server apparatus 12 and shares a display screen with other conference client apparatuses 10 in real-time when the conference client apparatus 10 is participating in a conference.

Further, the conference client apparatus 10 receives data that is registered by using a chat function from an operator such as a presenter, a moderator, or a participant via the conference server apparatus 12. Further, the conference client apparatus 10 displays the received data on a chat screen.

The conference client apparatus 10 can switch between two types of modes, a share mode and an individual mode. For example, when the conference client apparatus 10 is in the share mode, the conference handouts displayed on the screen of the conference client apparatus 10 of a participant can be displayed in synchronization with the conference handouts displayed on the screen of the conference client apparatus 10 of a presenter as the conference is proceeded (moderated) by the moderator. The synchronized display of data includes, for example, displaying a page of a conference handout, displaying a handwritten on a conference handout, or displaying a pointer pointed to a conference handout.

When the conference client apparatus 10 is in the individual mode, a conference handout can be freely displayed on the conference client apparatus 10 regardless of the progress of the conference proceeded by the moderator. That is, a conference handout can be displayed on the conference client apparatus 10 without synchronizing with the conference handout displayed on the conference client apparatus 10 of a presenter (asynchronous display). The conference handout is an example of contents subjected to an operation (e.g., change of display page, addition of handwritten note) input by a presenter or a moderator of a conference.

The conference display apparatus 14 is placed in, for example, a conference room. The conference display apparatus 14 is an example of an output apparatus that allows a conference handout to be viewed on a large screen. The conference display apparatus 14 may be, for example, a display apparatus such as an electronic whiteboard or a projecting apparatus such as a projector.

Note that the conference system 1 illustrated in FIG. 1 is merely an example and does not need to include all of the apparatuses illustrated in FIG. 1. For example, the conference system 1 may have a configuration allowing one or more conference client apparatuses 10 to substitute a function of the conference server apparatus 12. Further, the conference display apparatus 14 may be omitted from the conference system 1.

Further, the conference system 1 may have a configuration allowing other devices to implement a part of the functions of the conference server apparatus 12. The conference system 1 of FIG. 1 includes a chat server apparatus that implements the chat function of the conference server apparatus 12.

<Hardware Configuration>

Figure 2:
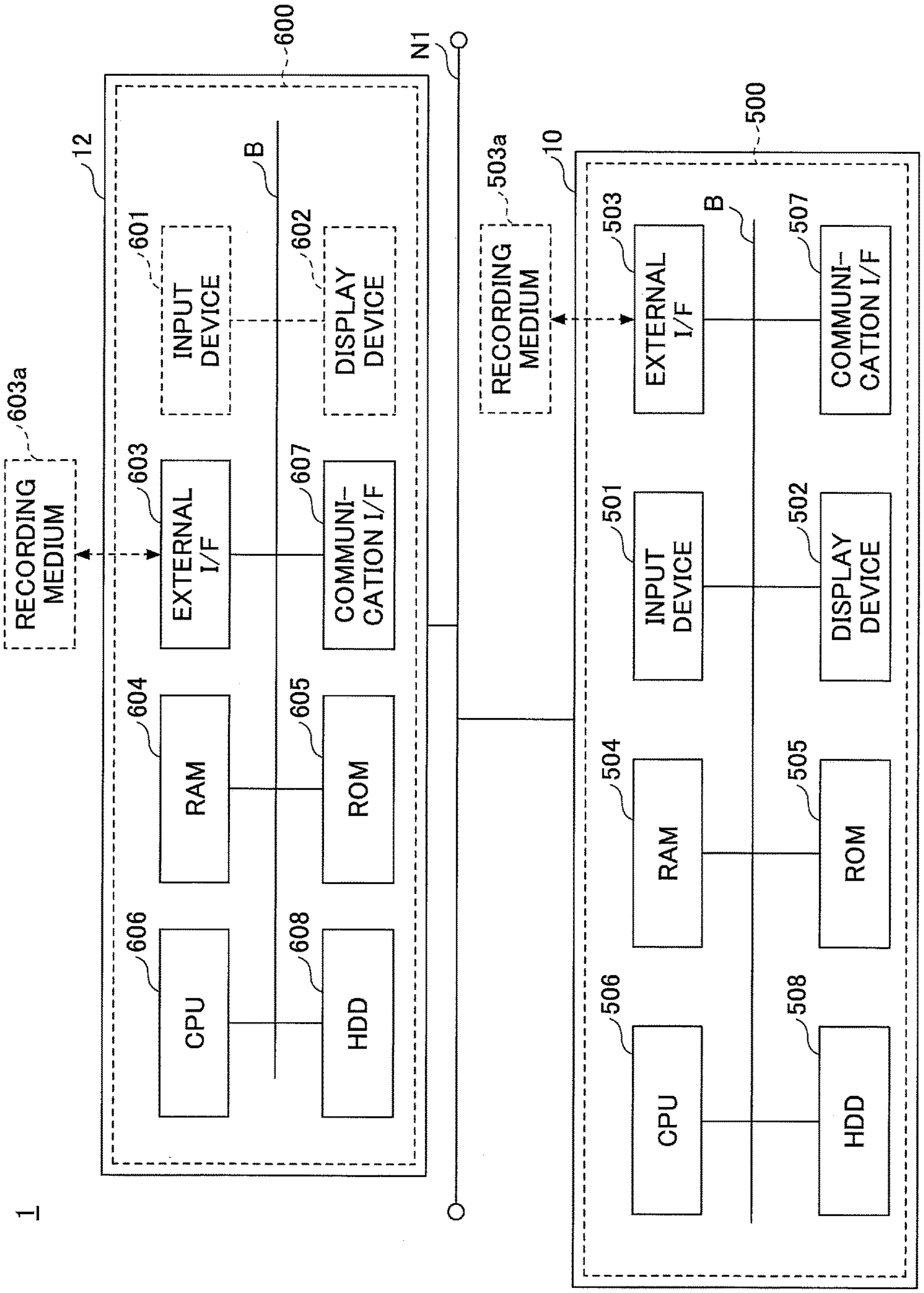
FIG. 2 is a schematic diagram illustrating a hardware configuration of a computer according to an embodiment of the present invention.

The conference client apparatus 10 and the conference server apparatus 12 may be implemented by using the hardware configuration illustrated in FIG. 2.

FIG. 2 is a schematic diagram illustrating a hardware configuration of a computer 500 included in the conference client apparatus 10 and a computer 600 included in the conference server apparatus 12 of the conference system 1 according to an embodiment of the present invention.

The conference client apparatus 10 of FIG. 2 includes a computer 500. The computer 500 includes, for example, an input device 501, a display device 502, an external I/F 503, a RAM (Random Access Memory) 504, a ROM (Read Only Memory) 505, a CPU (Central Processing Unit) 506, a communication I/F 507, and a HDD (Hard Disk Drive) 508 that are connected to each other by a bus B. Note that the conference client apparatus 10 may also include a camera, a microphone, and a speaker device.

The input device 501 includes, for example, a keyboard, a mouse, and a touch panel. The input device 501 allows the user to input an operation signal. The display device 502 includes, for example, a display. The display device 502 displays the results of processes performed by the computer 500.

The communication I/F 507 is an interface that connects the computer 500 to various networks. Accordingly, the computer 500 can perform data communication by way of the communication I/F 507.

The HDD 508 is an example of a non-volatile storage device that stores programs and data therein. The programs and data stored in the HDD 508 may include, for example, an OS serving as basic software for controlling the entire computer 500, and application software (hereinafter also referred to as "application") for providing various functions by way of the OS. Alternatively, the computer 500 may use a drive using a flash memory as a recording medium (e.g., SSD (Solid State Drive) instead of the HDD 508.

The external I/F 503 is an interface with an external device. The external device may be, for example, a recording medium 503*a*. Thereby, the computer 500 can read data from and/or write data to the recording medium 503*a* by way of the external I/F 503. The recording medium 503*a* may be, for example, a flexible disk, a CD (Compact Disc), a DVD (Digital Versatile Disc), an SD (Secure Digital) memory card, or a USB (Universal Serial Bus) memory.

The ROM 505 is an example of a non-volatile memory (storage device) that can retain programs and data even when electric power is turned off. For example, programs and data (e.g., (e.g., BIOS, OS settings, network settings) that are executed when the computer 500 is activated are stored in the ROM 505. The RAM 504 is an example of a volatile semiconductor memory (storage device) that temporarily stores programs and data therein.

The CPU 506 is an operation device that implements the controls and functions of the entire computer 500 by reading programs and data from storage devices such as the ROM 505 and the HDD 508, loading the programs and data to the RAM 504, and executing the processes of the program and data loaded to the RAM 504.

The conference client apparatus 10 can implement the below-described processes by, for example, executing a program with the hardware configuration illustrated in FIG. 2.

The conference server apparatus 12 of FIG. 2 includes a computer 600. The computer 600 includes, for example, an input device 601, a display device 602, an external I/F 603, a RAM 604, a ROM 605, a CPU 606, a communication I/F 607, and an HDD 608 that are connected to each other by a bus B. The hardware configuration of the conference server apparatus 12 is substantially the same as the hardware configuration of the conference client apparatus 10. It is, however, to be noted that the input device 601 and the display device 602 may be connected to the computer 600 only when needed.

The conference server apparatus 12 can implement the below-described processes by, for example, executing a program with the hardware configuration illustrated in FIG. 2.

<Software Configuration>

Figure 3:
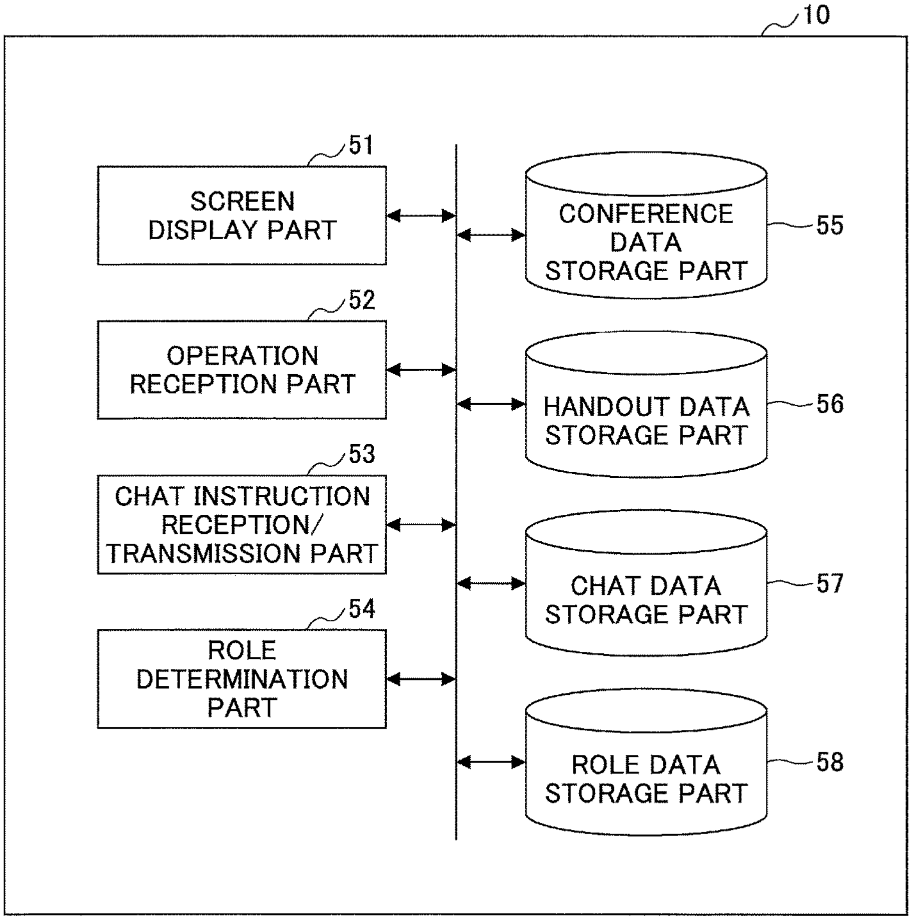
FIG. 3 is a functional block diagram of a conference client apparatus according to an embodiment of the present invention.
Figure 4:
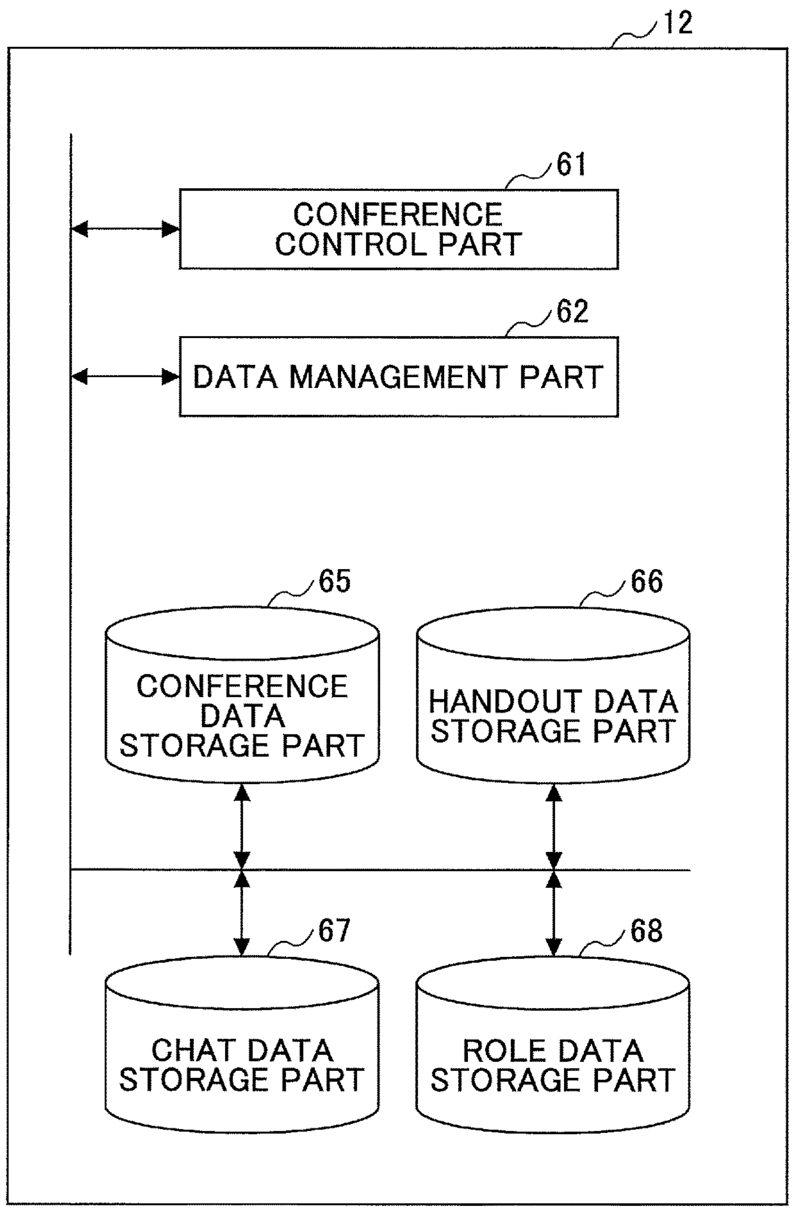
FIG. 4 is a functional block diagram of a conference server apparatus according to an embodiment of the present invention.

Each of the conference client apparatus 10 and the conference server apparatus 12 according to an embodiment of the present invention is implemented by the functional blocks illustrated in FIGS. 3 and 4. Note that the functional blocks of FIGS. 3 and 4 are depicted merely for purposes of illustrating the configuration of the present invention. Thus, some parts/components of the conference client apparatus 10 and the conference server apparatus 12 are omitted for the sake of convenience.

<<Conference Client Apparatus>>

FIG. 3 is a functional block diagram of the conference client apparatus 10 according to an embodiment of the present invention. The conference client apparatus 10 implements a screen display part, an operation reception part 52, a chat instruction transmission/reception part 53, and a role determination part 54 by executing a program stored in, for example, the ROM 505 or the HDD 508. The program executed in the conference client apparatus 10 includes, for example, an application loaded to the RAM 504.

The screen display part 51 displays a conference screen by using, for example, conference data and conference handouts obtained from the conference server apparatus 12. The screen display part 51 also displays a chat screen. The operation reception part 52 receives various operations input by an operator such as a presenter, a moderator, or a participant of a conference. The chat instruction transmission/reception part 53 transmits/receives chat instructions with the conference server apparatus 12.

The chat instruction may include, for example, an ID that uniquely identifies the order of chats to be displayed, contents that identifies the content of a chat, the name of the chat to be displayed, a role, data pertaining to a handout and page when transmitting chat data, and data pertaining to the time and date. The chat instruction transmitted to the conference server apparatus 12 is distributed to other conference client apparatuses 10 participating in the same conference as the conference client apparatus 10 that transmitted the chat instruction.

The role determination part 54 determines the role of an operator. As described in detail below, the screen display part 51 determines the position for displaying an operator-registered data on a chat screen based on the role of the operator that transmitted the chat instruction.

The conference data storage part 55 stores conference data received from the conference server apparatus 12. The handout data storage part 56 stores handout data and conference handouts received from the conference server apparatus 12. The conference handout shown in the handout data includes, for example, a file of a predetermined format such as a PDF (Portable Document Format) file.

Further, the chat data storage part 57 stores chat instructions received from the conference server apparatus 12. The role data storage part 58 stores, for example, role data received from the conference server apparatus 12 and a role display correspondence table formed according to the role data. The chat instruction, the role data, and the role correspondence table are described in further detail below.

<<Conference Server Apparatus>>

FIG. 4 is a functional block diagram of the conference server apparatus 12 according to an embodiment of the present invention. The conference server apparatus 12 implements a conference control part 61, a data management part 62, a conference data storage part 65, a handout data storage part 66, a chat data storage part 67, and a role data storage part 68 by executing a program stored in, for example, the ROM 605 or the HDD 608.

The conference control part 61 provides functions such as organizing a conference, controlling participation to a conference, distributing the data input by a presenter or a moderator to the conference client apparatuses 10 of the participants of a conference in real time. The data management part 62 manages, for example, conference data, handout data, chat data, and role data.

Further, the conference data storage part 65 stores the conference data. The chat data storage part 67 stores chat instructions received from the conference client apparatus 10. The role data storage part 68 stores role data.

In the conference system 1 according to an embodiment of the present invention, the moderator of a conference can perform an operation of determining a presenter of the conference and the handouts of the conference. In addition, the moderator may also be able to perform a part of the operations that the presenter can perform.

The presenter of a conference can perform an operation of, for example, sending a page of a conference handout (page synchronization), making a handwritten note (handwritten note synchronization), and magnifying/de-magnifying (magnification/de-magnification synchronization). The participant of a conference can perform an operation of, for example, viewing (browsing) a conference handout. Note that the role of the presenter may be switched in the middle of a conference.

<<Role Data>>

FIG. 5 is a schematic diagram illustrating an example of a configuration of role data. The role data is transmitted from the conference server apparatus 12 to the conference client apparatus 10 when, for example, the user of the conference client apparatus 10 is participating a conference. The role data is transmitted by using, for example, XMPP (Extensible Messaging and Presence Protocol) in the same manner as transmitting a page or a chat instruction.

The role data of FIG. 5 includes, for example, a role setting that indicates the correspondence between a role name and an identification name and a chat setting that indicates the side (right or left) in which data is to be displayed. Although the role data of FIG. 5 includes a chat setting for displaying data in two horizontally aligned rows (one row on the left and the second row on the right) in a chat screen, the role data may include a chat setting for displaying data in a designated coordinate range of a chat screen that is defined by designating a coordinate range in the chat screen.

In the example of the role data of FIG. 5, the role name of the conference client apparatus 10 having an identification name "office" is "moderator". Further, the role name of the conference client apparatus 10 having an identification name "Ichiro, Jiro, Saburo" is "presenter". Note that the role name of the conference client apparatus 10 having an identification name that is not included in the role data of FIG. 5 is "participant". In the example of FIG. 5, although the role name of the conference client apparatus 10 having an identification name that is not included in the role data is assumed as "participant", the role data may include an identification data indicating that the role name is "participant".

The conference client apparatus 10 that receives the role data of FIG. 5 creates a role display correspondence table as illustrated in FIG. 6A. FIGS. 6A and 6B illustrate an example in which the role display correspondence table for displaying two horizontally aligned rows is used.

FIG. 6A illustrates a role display correspondence table in a case where data is displayed in two horizontally aligned rows. In a case where the role display correspondence table of FIG. 6A is used, data registered by an operator having the role name "presenter" or "moderator" is determined to be displayed on the right side of a chat screen as illustrated in FIG. 6B. Further, data registered by an operator having the role name "participant" is determined to be displayed on the left side of the chat screen as illustrated in FIG. 6B.

Alternatively, the conference client apparatus 10 may create a role display correspondence table as illustrated in, for example, FIG. 7A. FIGS. 7A and 7B illustrate an example in which a role display correspondence table displaying two vertically aligned rows is used.

FIG. 7A illustrates a role display correspondence table in a case where data is displayed in two vertically aligned rows. For example, in a case where the role display correspondence table of FIG. 7A is used, data registered by an operator having the role name "presenter" or "moderator" is determined to be displayed on the upper side of a chat screen as illustrated in FIG. 7B. Further, data registered by an operator having the role name "participant" is determined to be displayed on the lower side of the chat screen as illustrated in FIG. 7B.

Figures 8A, 8B:
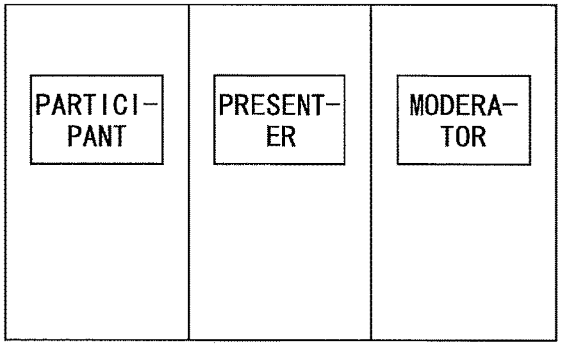
FIGS. 8A and 8B are schematic diagrams illustrating a role display correspondence table according to an embodiment of the present invention.

Alternatively, the conference client apparatus 10 may create a role display correspondence table as illustrated in, for example, FIG. 8A. FIGS. 8A and 8B illustrate an example in which a role display correspondence table for displaying three horizontally aligned rows is used.

FIG. 8A illustrates a role display correspondence table in a case where data is displayed in three horizontally aligned rows (i.e., left row, center row, right row). For example, in a case where the role display correspondence table of FIG. 8A is used, data registered by an operator having the role name "presenter" is determined to be displayed in the center row of a chat screen as illustrated in FIG. 8B. Further, data registered by an operator having the role name "moderator" is determined to be displayed in the right row as illustrated in FIG. 8B. Further, data registered by an operation having the role name "participant" is determined to be displayed on the left row of the chat screen as illustrated in FIG. 8B.

The role display correspondence tables illustrated in FIGS. 6A, 7A, and 8A are merely examples. Other role display correspondence tables may be used as long the role of an operator having registered data on a chat screen can be identified from the position of displayed data in the chat screen. In addition to using the role display correspondence table to determine the position for displaying data on a chat screen, the role display correspondence table may be used to determine the color of data or the shape of the balloon of data according to the role of the operator.

Of the multiple conference client apparatuses 10 participating in the same conference, one conference client apparatus 10 has the role of a presenter, one or more conference client apparatuses 10 have the role of a moderator or a participant according to the conference system 1 of the below-described embodiment. In a case of switching the roles of the presenter and the participant, the role of the conference client apparatus 10 that previously was "presenter" becomes "participant" whereas a conference client apparatus 10 that has become the new presenter obtains the new role name "presenter".

<Process Details>

Next, the processes of the conference system 1 according to an embodiment of the present invention are described in detail.

<<Conference Participation Process>>

Figure 9:
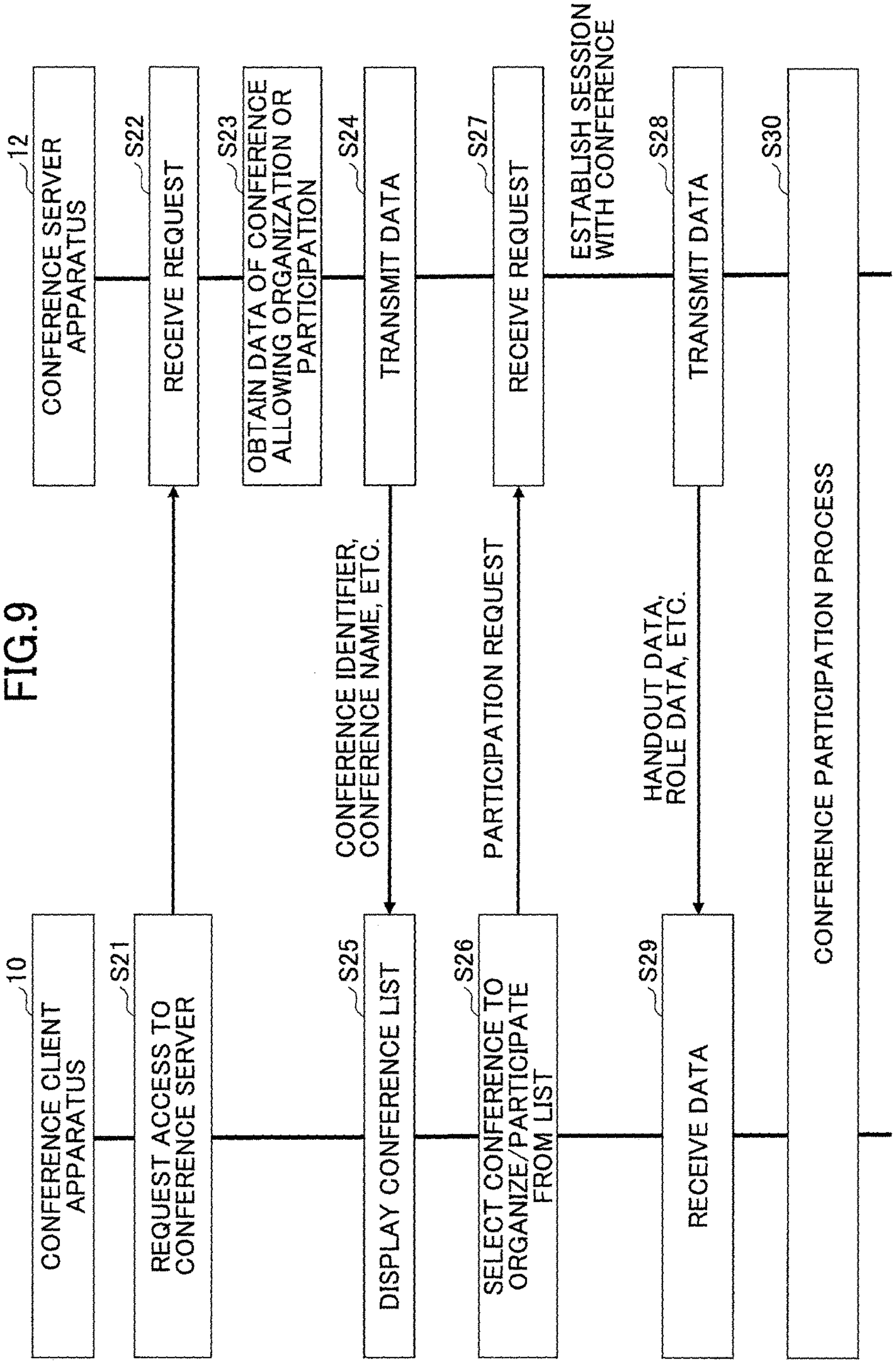
FIG. 9 is a flowchart illustrating a conference participation process according to an embodiment of the present invention.

FIG. 9 is a flowchart illustrating an example of a conference participation process according to an embodiment of the present invention. A presenter, a moderator, or a participant of a conference operates the conference client apparatus 10 and requests access to a conference participation screen of the conference server apparatus 12. In Step S21, the screen display part 51 of the conference client apparatus 10 performs a conference data obtaining request by accessing, for example, a URI of a conference participation screen of the conference server apparatus 12. Alternatively, the screen display part 51 of the client apparatus 10 may request for obtaining conference data by transmitting a conference data obtaining request to the conference server apparatus 12.

In Step S22, the conference control part 61 of the conference server apparatus 12 receives the conference data obtaining request from the conference client apparatus 10. In Step S23, the data management part 62 obtains conference data of a conference allowed to be organized or participated by the conference client apparatus 10 based on the conference data obtaining request transmitted from the conference client apparatus 10. Then, in Step S24, the conference control part 61 transmits the conference data of a conference, which is currently allowed to be organized or participated by the conference client apparatus 10, to the conference client apparatus 10.

In Step S25, the screen display part 51 of the conference client apparatus 10 displays a conference participation screen on, for example, the display device 502. The data displayed in the conference participation screen includes a conference list that is based on the conference data of a conference(s) allowed to be organized or participated by the conference client apparatus 10.

In Step S26, the presenter, the moderator, or the participant of the conference selects the conference that the presenter, the moderator, or the participant desires organize or participate from the conference list displayed on the conference participation (selection) screen. The screen display part 51 of the conference client apparatus 10 transmits a request for participating in a conference selected by the presenter, the moderator, or the participant of the conference (participation request) to the conference server apparatus 12.

In Step S27, the conference control part 61 of the conference server apparatus 12 establishes a session (communication path) with the conference client apparatus 10 based on the participation request from the conference client apparatus 10. Accordingly, the conference server apparatus 12 and the conference client apparatus 10 participating in the conference 10 use the established session to exchange, for example, data required for sharing a conference screen or using a chat function.

With the conference system 1 according to the above-described embodiment, a message indicating data input by the conference client apparatus 10 having the role of a presenter or a moderator can be distributed in real time by using the session established between the conference server apparatus 12 and the conference client apparatuses 10 participating in a conference. Thereby, a conference screen can be shared by the conference client apparatuses 10. Further, by using the session established with the client server apparatus 12, the conference client apparatus 10 participating in the conference can distribute a message of a chat instruction to the other conference client apparatuses 10 having the role of the presenter, the moderator, or the participant via the conference server apparatus 12 in real time, and implement a chat function.

The XMPP is a representative example of a protocol for using the session established between the conference server apparatus 12 and the conference client server apparatus 10 and distributing a message in real time. A service called "group chat" can be provided by using XMPP.

The group chat is a function that allows a message to be distributed to all conference client apparatuses 10 when a conference client apparatus 10 participating in a room (conference room) provided by the XMPP transmits the message to the conference server apparatus 12. Sessions may also use protocols and methods other than XMPP. There is, for example, BOSH that is an extension of XMPP, WebSocket, and Commet.

In Step S28, the conference control part 61 of the conference server apparatus 12 transmits handout data and role data to the conference client apparatus 10 in response to the participation request transmitted from the conference client apparatus 10. In a case where a conference is already taking place, the conference control part 61 may also transmit, for example, data of handout that is currently being displayed in the conference, the page of the currently display handout, or data of the current presenter.

In Step S29, the screen display part 51 of the conference client apparatus 10 receives the handout data and the role data from the conference server apparatus 12. In Step S30, the screen display part 51 performs a conference participation process. The conference participation process includes obtaining data of a conference handout (i.e., handout of a conference that the conference client apparatus 10 is to participate in) from, for example, the handout data storage part 66 indicated by the URI of the handout data and a process of displaying the data of the conference handout on a conference screen. The conference participation process also includes determining the role of the operator of the conference client apparatus 10.

<<Determining Role of Operation of Conference Client Apparatus>>

Figure 10:
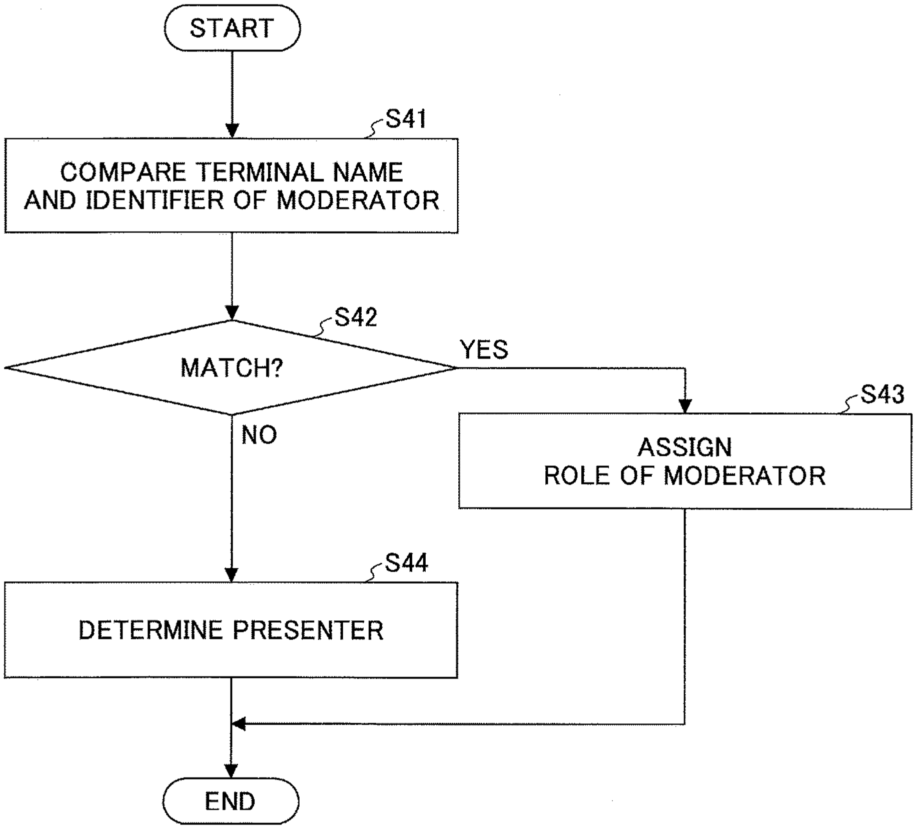
FIG. 10 is a flowchart illustrating a role determination process according to an embodiment of the present invention.

The role determination part 54 in each conference client apparatus 10 performs a role determination process illustrated in FIG. 10 to determine the role assigned to the conference client apparatus 10 itself. The determination process may be performed, for example, when a conference client apparatus 10 participates in a conference, when a conference client apparatus 10 itself changes its own identification name, or when a conference client apparatus 10 is instructed to change its role during a conference.

FIG. 10 is a flowchart illustrating an example of the role determination process according to an embodiment of the present invention. In Step S41, the role determination part 54 of the conference client apparatus 10 compares the identification name of the moderator included in the role data of FIG. 5 and the terminal name (identification name) of the conference client apparatus 10 itself.

If the identification name of the moderator included in the role data matches the terminal name (identification name) of the conference client apparatus 10 itself, the role determination part 54 proceeds from Step S42 to Step S43 to assign the role of the moderator to the conference client apparatus 10 itself. If the identification name of the moderator included in the role data does not match the terminal name (identification name) of the conference client apparatus 10 itself, the role determination part 54 proceeds from Step S42 to Step S44 to determine whether the role of the conference client apparatus 10 is the presenter and assign the role of the presenter or the participant to the conference client apparatus 10 itself.

Note that the identification name of the moderator may be expressed by using a regular expression. Further, user identification data (e.g., user name, user ID) may be used to express the identification name of the moderator in a case where the conference system 1 has a user authentication function. In Step S44, the role determination part 54 may determine whether the role of the conference client apparatus 10 itself is a presenter or a participant depending on whether the conference client apparatus 10 itself has authorization for switching the presenter instead of determining the presenter depending on the identification name of the conference client apparatus 10. By performing the role determination process illustrated in FIG. 10, the conference client apparatus 10 can determine the role of the conference client apparatus 10 itself.

<<Chat Instruction Transmission>>

Figure 11:
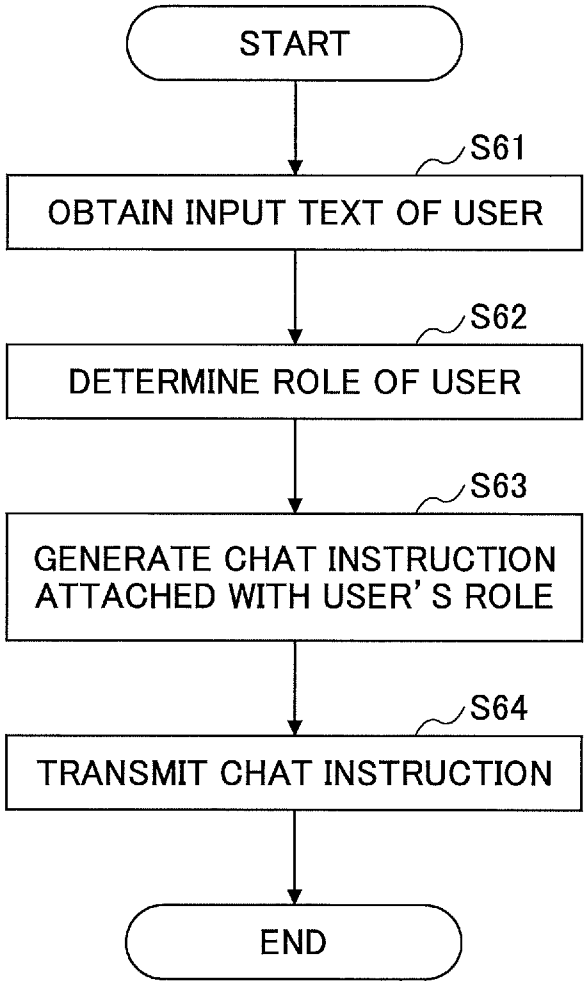
FIG. 11 is a flowchart illustrating a chat instruction transmission process according to an embodiment of the present invention.

The chat instruction transmission/reception part 53 of the conference client apparatus 10 performs a chat instruction transmission process (FIG. 11) for transmitting a chat instruction (FIG. 12). FIG. 11 is a flowchart illustrating a chat instruction transmission process according to an embodiment of the present invention. FIG. 12 is a schematic diagram illustrating a configuration of a chat instruction according to an embodiment of the present invention.

In Step S61, the operation reception part 52 of the conference client apparatus 10 receives input of a text (characters) corresponding to a chat function from the user (operator) of the conference client apparatus 10. In this embodiment, the chat function is input by corresponding text data. Alternatively, the chat function may be input by a corresponding image or a corresponding moving image.

In Step S62, the role determination part 54 determines the role of the user (operator) by determining the role of the conference client apparatus 10. In Step S63, the chat instruction transmission/reception part 53 creates a chat instruction as illustrated in FIG. 12. The chat instruction is added with data pertaining to the role of the user (operator) of the conference client apparatus 10.

The chat instruction of FIG. 12 is one example of a chat instruction in which the role of the user is a "presenter". The chat instruction of FIG. 12 may include, for example, display order ID data, contents data, display name data, role data, handout page data, and time/date data. The display order ID data includes data that uniquely identifies the order of displaying a chat(s). The contents data includes data that indicates a text (character) input by the user. The display name data indicates the name of the user that is displayed during a chat. The role data indicates the role of the user. The handout page data indicates data of a handout during the transmitting of chat data (e.g., "112") and data of a page of the handout (e.g., "5"). The time/date data indicates the time and data of transmitting a chat.

Then, in Step S64, the chat instruction transmission/reception unit 53 transmits the chat instruction (FIG. 12) created in Step S63 to the conference server apparatus 12, so that the chat instruction is distributed to other conference client apparatuses 10 participating in the same conference as the conference client apparatus 10 by way of the conference server apparatus 12.

<<Chat Instruction Reception>>

Figure 13:
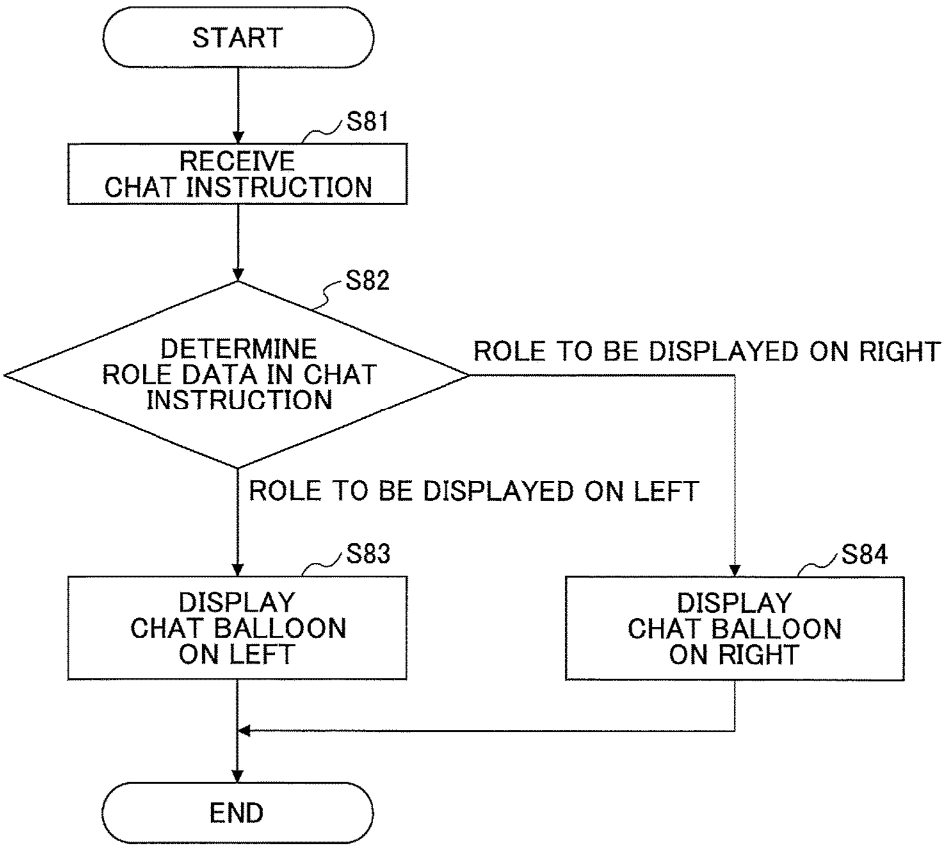
FIG. 13 is a flowchart illustrating a chat instruction reception process according to an embodiment of the present invention.
Figure 14:
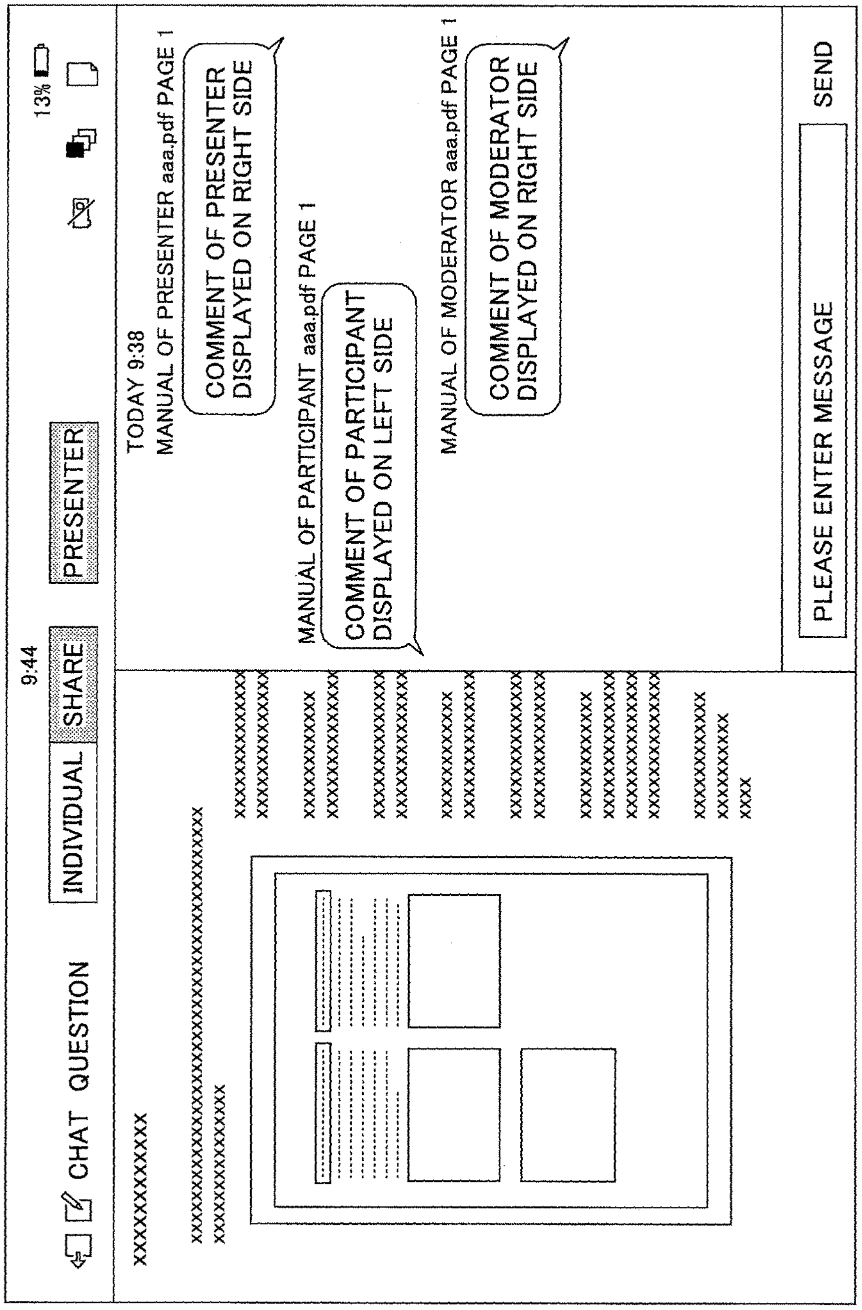
FIG. 14 is a schematic diagram illustrating a conference screen displaying a chat according to an embodiment of the present invention.

The conference client apparatus 10 that has received the conference chat instruction distributed from the conference server apparatus 12 performs a chat instruction reception process (FIG. 13) and displays a chat screen (FIG. 14). FIG. 13 is a flowchart illustrating the chat instruction reception process according to an embodiment of the present invention. FIG. 14 is a schematic diagram illustrating a conference screen displaying a chat according to an embodiment of the present invention.

In Step S81, the chat instruction transmission/reception part 53 of the conference client apparatus 10 receives a chat instruction (FIG. 12) distributed via the conference server apparatus 12. In Step S82, the screen display part 51 of the conference client apparatus 10 determines the role of the user that has input data (e.g., text) based on the role data included in the received chat instruction.

The screen display part 51 refers to, for example, the role display correspondence table of FIG. 6 to determine the role of the user included in the chat instruction. If the role of the user (role name) included in the chat instruction is the role name "participant" that is to be displayed on the left side of the conference screen, the screen display part 51 proceeds from Step S82 to Step S83 to display, for example, a bubble of a chat indicating text data or the like on the left side of the conference screen.

If the role of the user (role name) included in the chat instruction is the role name "presenter" or "moderator" that is to be displayed on the right side of the conference screen, the screen display part 51 proceeds from Step S82 to Step S84 to display, for example, a bubble of a chat indicating text data or the like on the right side of the conference screen.

In the conference screen of FIG. 14, a chat screen is provided on the right side of the conference screen. A chat bubble of the user having the role of a "presenter" or a "moderator" is displayed on the right side of the chat screen. A chat bubble of the user having the role of a "participant" is displayed on the left side of the chat screen.

By dividing the positions (areas) for displaying the bubbles of a chat depending on the role of the user during a conference or the like, the role of each speaker of the chat can be easily distinguished by the position in which the bubble of the chat is displayed on the conference screen. In the chat screen of FIG. 14, the positions (areas) for displaying the bubbles of a chat for each role are divided into left and right sides. For example, in a case where there are multiple presenters such as during a roundtable conference or a question and answer session in a presentation, the remarks of the presenters can be gathered on the right side of the chat screen. Therefore, the remarks of the presenters can easily be confirmed.

Further, by dividing the positions (areas) for displaying the bubbles of a chat depending on the role of the user during a conference or the like, the positions for displaying remarks in a chat are different even in a case where remarks are made by the same user as long as the roles of the user are different when the remarks are made.

Second Embodiment

In the conference system 1 of the first embodiment, the role of an operator is determined at the conference client apparatus 10. In the conference system 1 of the second embodiment, the role of an operator is determined by the conference server apparatus 12. In the second embodiment, like components/parts are denoted with like reference numerals and are not further explained.

Figure 15:
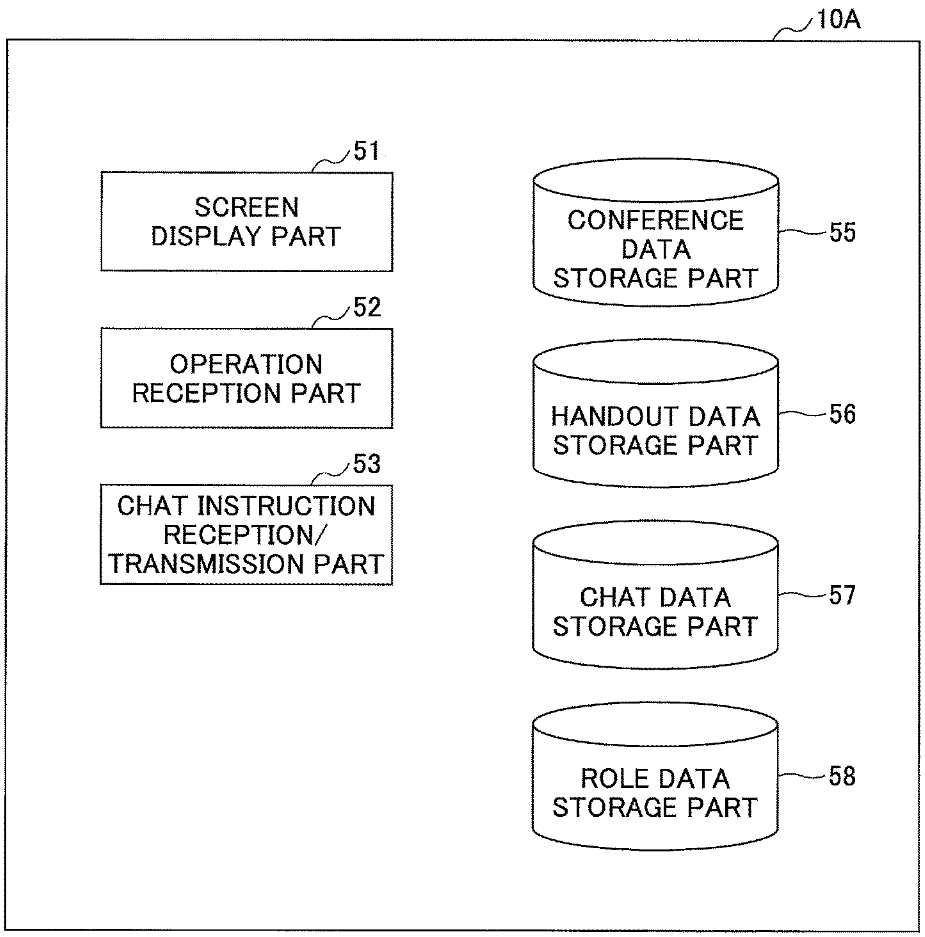
FIG. 15 is a functional block diagram of a conference client apparatus according to a second embodiment of the present invention.

FIG. 15 is a functional block diagram of the conference client apparatus 10A according to the second embodiment of the present invention. The configuration of the conference client apparatus 10 of FIG. 15 is that the role determination part 54 is omitted from the configuration of the conference client apparatus 10 of FIG. 3. Because the conference client apparatus 10A of FIG. 15 does not include the role determination part 54, the conference client apparatus 10A does not perform the process of determining the role of the operator of the conference client apparatus 10A itself in the chat instruction transmission step of FIG. 11 (Step S62).

Further, in Step S63 of FIG. 11, the chat instruction transmission/reception part 53 of the conference client apparatus 10A creates a chat instruction attached with an identification name of the conference client apparatus 10A itself instead of creating a chat instruction attached with the role of the operator of the chat instruction transmission/reception part 53. Then, in Step S64 of FIG. 11, the chat instruction transmission/reception part 53 of the conference client apparatus 10A transmits the chat instruction attached with the identification name of the conference client apparatus 10A itself to the conference server apparatus 12.

Figure 16:
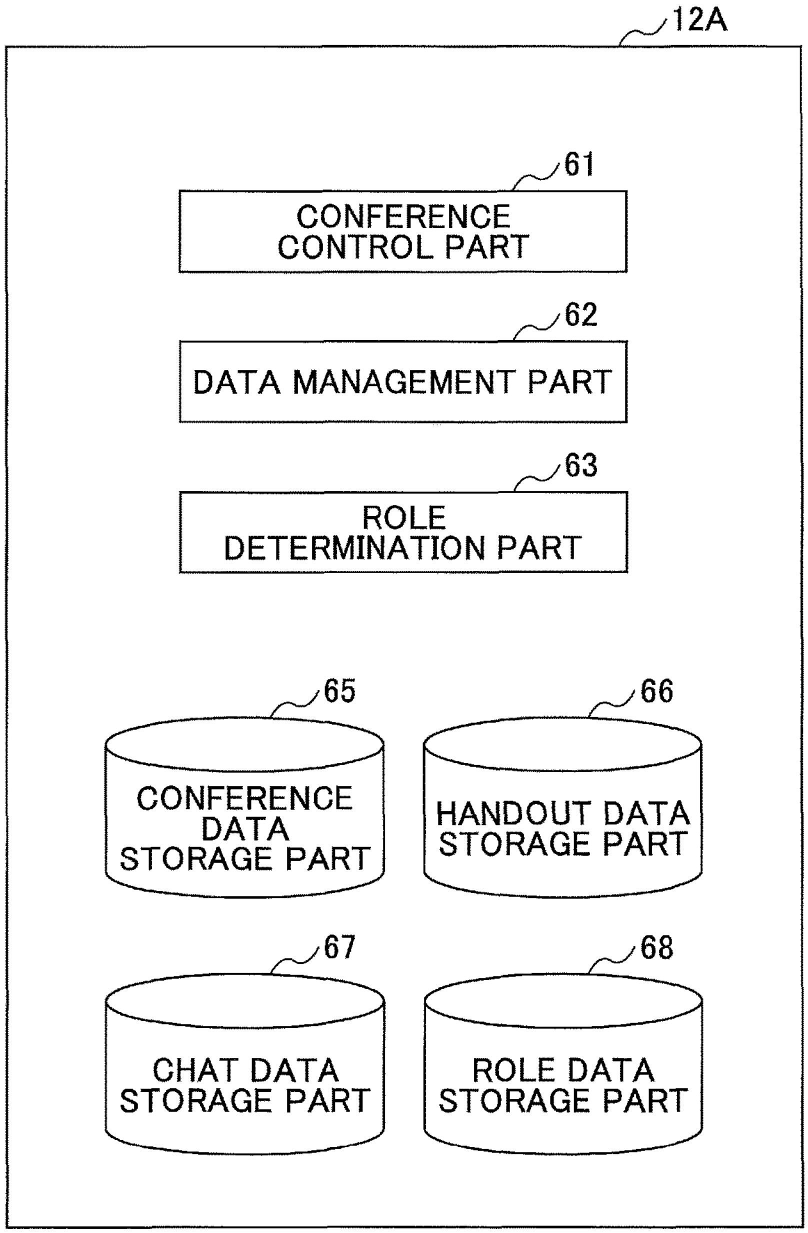
FIG. 16 is a functional block diagram of a conference server apparatus according to the second embodiment.

FIG. 16 is a functional block diagram of a conference server apparatus 12A according to the second embodiment of the present invention. The conference server apparatus 12A of FIG. 16 has a configuration in which a role determination part 63 is added to the conference server apparatus 12A of FIG. 4. Because the conference server apparatus 12A includes the role determination part 63, the conference server apparatus 12A can determine the role of the operator (user) of the conference client apparatus 10A that transmitted the chat instruction based on the identification name of the conference client apparatus 10A that is attached to the chat instruction, by the conference client apparatus 10A.

Figure 17:
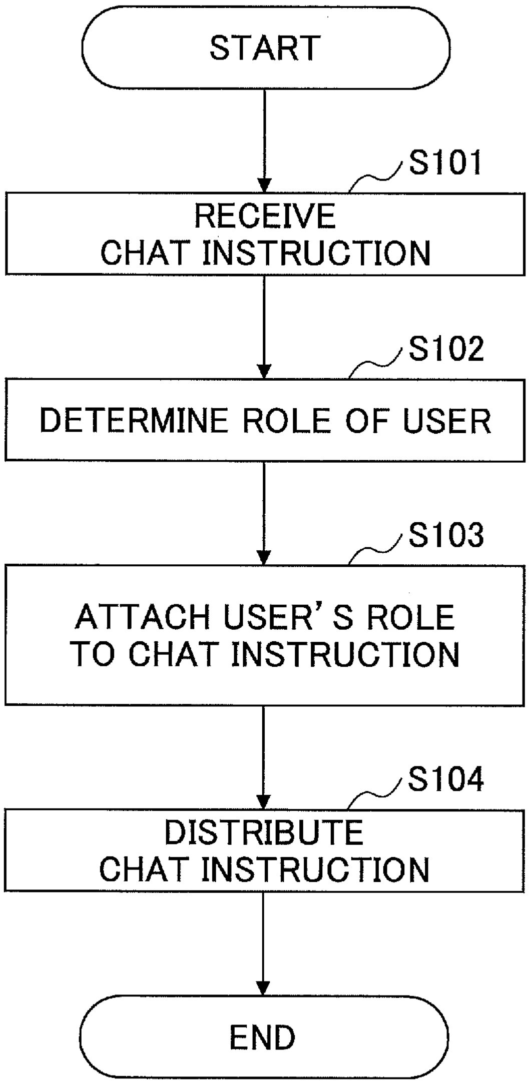
FIG. 17 is a flowchart illustrating an example of the chat instruction distribution process according to an embodiment of the present invention.

The conference server apparatus 12A that has received the chat instruction from the conference client apparatus 10A performs a chat instruction distribution process as illustrated in FIG. 17. FIG. 17 is a flowchart illustrating an example of the chat instruction distribution process according to an embodiment of the present invention.

In Step S101, the conference control part 61 of the conference server apparatus 12 receives a chat instruction from the conference client apparatus 10A. An identification name of the conference client apparatus 10A that transmitted the chat instruction is attached to the chat instruction. In Step S102, the role determination part 63 determines the role of the operator (user) of the conference client apparatus 10A that transmitted the chat instruction based on the identification name of the conference client apparatus 10A attached to the chat instruction, by the conference client apparatus 10A.

Because the role determination performed by the role determination part 63 is the same as the role determination part 54 of the conference client apparatus 10 of the first embodiment, further description thereof is omitted. Then, the conference control part 61 attaches the role of the operator of the conference client apparatus 10A determined by the role determination part 54 to the chat instruction received from the conference client apparatus 10A. The conference control part 61 distributes the chat instruction attached with the role of the operator of the conference client apparatus 10A to the other conference client apparatuses 10A participating in the same conference as the conference client apparatus 10A that transmitted the chat instruction.

CONCLUSION

With the conference system 1 according to the above-described embodiments of the present invention, the positions of displaying registered data such as comments, images, and motion videos on a chat screen can be divided in correspondence with a role of a user that has registered the data. Thereby, the conference system 1 of the present invention enables the role of the user that has registered data to be easily distinguished in correspondence with each of the data registered in the chat screen.

The present invention is not limited to the specifically disclosed embodiments, and variations and modifications may be made without departing from the scope of the present invention.

For example, the conference server apparatus 12 is an example of a data process apparatus. The conference client apparatus 10 is an example of a terminal device. The conference system 1 is also an example of a data process apparatus. The chat screen is an example of a display column. The role display correspondence table is an example of role display correspondence data.

The role determination parts 54, 63 are examples of role determination units. The chat instruction reception/transmission part 53 and the conference control part 61 are examples of transmission units. The chat instruction reception/transmission part 53 is an example of a reception unit. The screen display part 51 is an example of a screen display unit.

Note that the above-described configuration of the conference system 1 including the conference client apparatus 10, the conference server apparatus 12, and the conference display apparatus 14 is merely an example. The configuration of the conference system 1 may be modified according to the usage and purpose of the conference system 1.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Because the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority Japanese Patent Application No. 2015-058020 filed on Mar. 20, 2015, with the Japanese Patent Office, the entire contents of which are hereby incorporated by reference.

What is claimed is:

1. A system comprising:

a first device including a first processor; and a second device connected to the first device via a network, the second device having a second processor and a display displaying a chat screen, wherein the first processor of the first device is configured to transmit:

a first chat instruction including (i) first text data generated by a first user and (ii) first role identification data indicating that the first user has a role of a presenter in a conference, and a second chat instruction including (i) second text data generated by a second user and (ii) second role identification data indicating that the second user has a role of a non-presenter participant in the conference, to the second device, wherein the second processor of the second device is configured to receive the first chat instruction and the second chat instruction and display the first text data included in the first chat instruction and the second text data included in the second chat instruction on the chat screen of the second device;

wherein the second processor is configured (i) to determine a position at which the first text data is displayed on the chat screen, based on a first display position previously associated with the first role identification data, and (ii) to determine a position at which the second text data is displayed on the chat screen, based on a second display position previously associated with the second role identification data, the second display position different than the first display position; and wherein the first display position and the second display position indicate respective positions at which the first text data and the second text data are to be displayed on the chat screen.

2. The system as claimed in claim 1, wherein the first device includes a role data storage unit that stores role data that includes identification data of a plurality of devices associated with identification data of roles of users of the plurality of devices, wherein the first processor refers to the role data stored in the role data storage unit and determines the first user having the role of the presenter and the second user having the role of the non-presenter participant based on the stored role data, and wherein the first processor is configured to generate the transmitted first chat instruction by attaching the first role identification data to the first text data generated by the first user, and to generate the transmitted second chat instruction by attaching the second role identification data to the second text data generated by the second user.

3. The system as claimed in claim 1, wherein the second device includes a role data storage unit that stores the first display position in association with the first role identification data and that stores the second display position in association with the second role identification data.

4. The system as claimed in claim 1, wherein a plurality of processors are provided as the first processor.

5. A display position determination method in a system including a first device including a first processor and a second device connected to the first device via a network and having a second processor and a display displaying a chat screen, the method comprising:

transmitting, by the first device, a first chat instruction including (i) first text data generated by a first user and (ii) first role identification data indicating that the first user has a role of a presenter in a conference, to the second device;

transmitting, by the first device, a second chat instruction including (i) second text data generated by a second user and (ii) second role identification data indicating that the second user has a role of a non-presenter participant in the conference, to the second device;

receiving the first chat instruction and the second chat instruction by the second device and displaying the first text data included in the first chat instruction and the second text data included in the second chat instruction on the chat screen of the second device;

determining, by the second device, a position at which the first text data is displayed on the chat screen of the second device based on a first display position previously associated with the first role identification data; and determining, by the second device, a position at which the second text data is displayed on the chat screen of the second device based on a second display position previously associated with the second role identification data, the second display position different than the first display position;

wherein the first display position and the second display position indicate respective positions at which the first text data and the second text data are to be displayed on the chat screen.

6. A non-transitory computer-readable recording medium on which programming is recorded for causing execution of a display position determination process in a system including a first device including a first processor and a second device connected to the first device via a network and having a second processor and a display displaying a chat screen, the display position determination process comprising:

transmitting, by the first device a first chat instruction including (i) first text data generated by a first user and (ii) first role identification data indicating that the first user has a role of a presenter in a conference, to the second device;

transmitting, by the first device, a second chat instruction including (i) second text data generated by a second user and (ii) second role identification data indicating that the second user has a role of a non-presenter participant in the conference, to the second device;

receiving the first chat instruction and the second chat instruction by the second device and displaying the first text data included in the first chat instruction and the second text data included in the second chat instruction on the chat screen of the second device;

determining, by the second device, a position at which the first text data is displayed on the chat screen of the second device based on a first display position previously associated with the first role identification data; and determining, by the second device, a position at which the second text data is displayed on the chat screen of the second device based on a second display position previously associated with the second role identification data, the second display position different than the first display position;

wherein the first display position and the second display position indicate respective positions at which the first text data and the second text data are to be displayed on the chat screen.

7. The system as claimed in claim 1, wherein the first device receives the transmitted first chat instruction from a third device connected to the first device and the second device via the network, and receives the transmitted second chat instruction from a fourth device connected to the first device and the second device via the network.

* * * * *